United States Patent
Lim

(10) Patent No.: US 9,513,689 B2
(45) Date of Patent: Dec. 6, 2016

(54) CONTROLLING PROCESSOR PERFORMANCE SCALING BASED ON CONTEXT

(71) Applicant: Intel Corporation, Santa Clara, CA (US)

(72) Inventor: Ghim Boon Lim, Klang (MY)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 14/319,035

(22) Filed: Jun. 30, 2014

(65) Prior Publication Data

US 2015/0378417 A1    Dec. 31, 2015

(51) Int. Cl.
*G06F 1/32* (2006.01)

(52) U.S. Cl.
CPC .............. *G06F 1/324* (2013.01); *G06F 1/3206* (2013.01)

(58) Field of Classification Search
CPC ...................................................... G06F 1/3234
USPC ......................................................... 713/320
See application file for complete search history.

(56) References Cited

U.S. PATENT DOCUMENTS

| | | | |
|---|---|---|---|
| 5,163,153 A | 11/1992 | Cole et al. | |
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 2001/0044909 A1 | 11/2001 | Oh et al. | |

(Continued)

FOREIGN PATENT DOCUMENTS

EP    1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Vincent Tran
(74) *Attorney, Agent, or Firm* — Trop, Pruner & Hu, P.C.

(57) ABSTRACT

In an embodiment, a processor includes a core to execute instructions, a power controller to control an operating frequency of the core, and a context filter logic coupled to the power controller to prevent a performance state change request from being granted by the power controller based at least in part on a context of a system including the processor. Other embodiments are described and claimed.

24 Claims, 11 Drawing Sheets

(56) References Cited

U.S. PATENT DOCUMENTS

| | | |
|---|---|---|
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0079290 A1 | 3/2012 | Kumar |
| 2012/0246506 A1 | 9/2012 | Knight |
| 2013/0007475 A1* | 1/2013 | Ganesan ................ G06F 1/324 713/300 |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0124126 A1* | 5/2013 | Ahuja ................... G01C 25/00 702/85 |
| 2013/0179703 A1* | 7/2013 | Burns ..................... G06F 1/26 713/300 |
| 2013/0346774 A1* | 12/2013 | Bhandaru ............. G06F 1/3234 713/320 |
| 2014/0068290 A1 | 3/2014 | Bhandaru et al. |
| 2015/0287351 A1* | 10/2015 | Holland .................. G09G 3/20 345/212 |

OTHER PUBLICATIONS

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

Developer World, Anna Aleryd, "How Sony's Battery Stamina Mode works," Apr. 3, 2013, 6 pages.

Extremetech, Ryan Whitwam, "How Samsung Galaxy S5's Ultra Power Saving Mode Makes 10% Battery Last 24 Hours," Apr. 9, 2014, 4 pages.

* cited by examiner

CONTROLLING PROCESSOR PERFORMANCE SCALING BASED ON CONTEXT

TECHNICAL FIELD

Embodiments pertain to reducing power consumption in a computing system.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
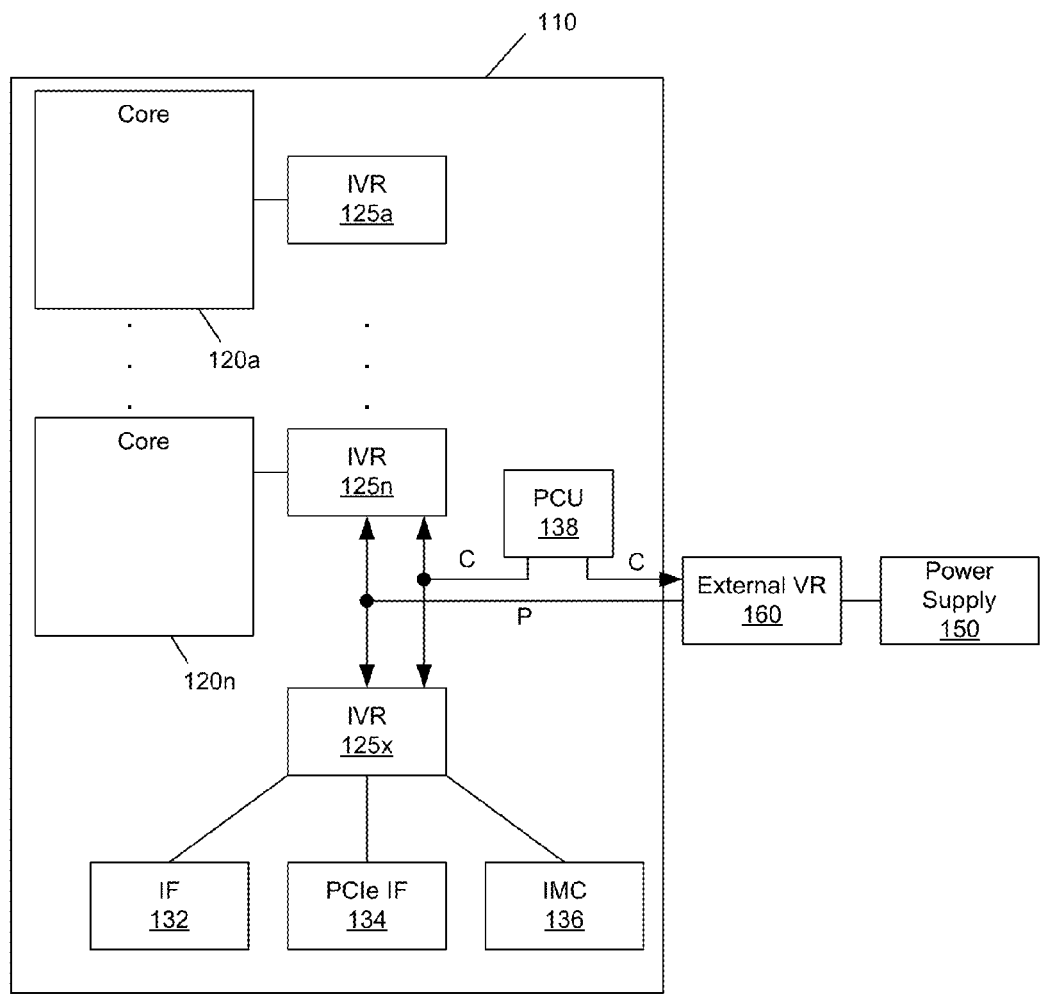
FIG. 1 is a block diagram of a system in accordance with one embodiment of the present invention.

Portable computing systems such as laptop computers, tablet computers, smartphones and so forth suffer from immense standby battery drain when left idle. That is, when such devices are not turned off, their battery life whittles down over time due to standby connectivity or recurring background task processing. These processes that occur when the device is idle bear a lot of consequences towards battery life as a result of a processor of the system (such as a multicore processor or other system on chip (SoC)) implementing aggressive frequency/voltage ramping in which higher operating frequencies and voltages are requested and provided to handle these background tasks (even though such tasks are often not time critical).

Such performance increases, particularly as effected over time, cause higher power leakage and/or heat dissipation. Background tasks also access other portions of a system (e.g., one or more sensor hubs or connectivity components such as global positioning system (GPS) tracking or connectivity synchronization) that might not be time critical, but increase or ramp the frequency/voltage aggressively at intervals. While disabling certain features like data connectivity or limiting operating frequency and/or voltage when a system is not being used can save power, such power saving measures either cripple or completely disable features for the sake of saving battery life. As such, these power saving techniques heavily and negatively impact user experience.

In various embodiments, a context state of one or more platform components may be used to preempt or filter one or more requests for increased system performance (e.g., in the context of increased processor performance through dynamic voltage and frequency scaling (DVFS)). More specifically, in a portable platform such as a portable computer, tablet computer, smartphone or so forth, a control logic may analyze one or more context state conditions, such as whether a display is on or off. When the display is powered off, the control logic may preempt or filter one or more increased performance requests received from, e.g., system software such as a kernel request or a hardware request received from a power controller of the processor. Understand that while in the examples described herein the context state condition is a display powering, embodiments are not so limited and many other context state conditions may be considered alone or together with display powering to determine whether to enable increased performance request filtering. For example in other embodiments, activity of one or more communication components of the system such as a wireless local area network component, a Bluetooth™ component or another radio component also may be considered.

Contextual scaling may be performed by preempting requests for voltage/frequency scaling of a core or other processing engine via a context filter, in an embodiment. The context filter may be configured to determine if scaling is to be allowed according to the context of the mobile device, for example, based upon display and/or digitizer/sensor hub activity. In this way, a system may be maintained in an appropriately powered state, as no peripheral devices (e.g., GPS/Wi-Fi™/Bluetooth™/data, etc.) are disabled. In addition, a reasonable user experience is maintained even when increased performance requests are preempted, as operating frequency is not capped, enabling users to perform tasks seamlessly regardless of system context.

Embodiments leverage that fact that a mobile device in a standby mode does not need a lot of processor resources to perform well. For example, typically when the display is off, no games or heavy duty applications are running Example usage models of a smartphone when its display is off include: listening to music (output from a digital file stored in a non-volatile storage of the smartphone or streaming from a local or wide area network source (e.g., a local network streaming device or an Internet downloaded stream)); downloading files or other information as a background task; or handling a call using a Bluetooth™ device.

In an embodiment, when a system context is active (e.g., as measured by display activity), a power manager of the processor (such as a power control unit or other power controller of the processor) may service each incoming performance scaling request (e.g., request to scale to higher or lower operating frequency and/or voltage). Such servicing includes causing the performance increase/decrease to occur if appropriate resources are available (e.g., power and thermal budget). If such resources are not available (e.g., in a constrained environment), the request may not be granted.

Instead when a system context is inactive (e.g., as measured by display inactivity), the power manager may not service at least some number of increased performance scaling requests. In some embodiments, a context filter may be coupled between scaling requesters (e.g., kernel or processor hardware) and power controller to preempt or otherwise prevent a configurable number of increase requests from reaching the power controller. Or in other embodiments, context filter logic may be implemented within the power controller itself to preempt this configurable number of increase requests.

Understand that in different embodiments, the control logic to effect increased performance request filtering can be implemented in different manners. For example, in some embodiments a context filter may couple between a peripheral controller hub such as a display and/or sensor control hub and a processor such as a SoC or other multicore processor that acts as an applications processor for the platform. Instead in other embodiments, the context filter may be implemented as a control logic within or coupled to a power controller of the processor or SoC itself. Of course, the context filtering performed may be implemented in other components in still further embodiments.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores 120*a*-120*n*. In addition, each core may be associated with an integrated voltage regulator (IVR) 125*a*-125*n* which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator 125*x*. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to filter increased performance requests based on system context, as described herein.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the context filtering described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 2:
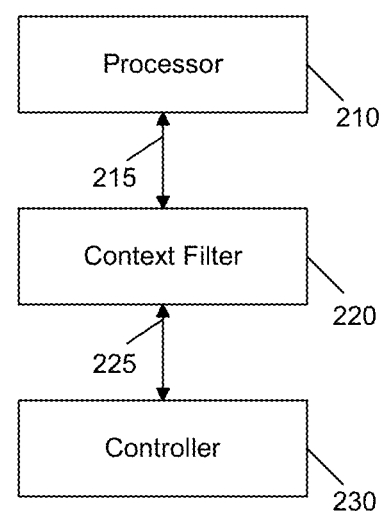
FIG. 2 is a block diagram of a portion of a system in accordance with an embodiment of the present invention.

Referring now to FIG. 2, shown is a block diagram of a portion of a system in accordance with an embodiment of the present invention. As shown in FIG. 2, system 200 includes a processor 210 which in an embodiment may be an SoC or other multicore processor. A context filter 220, which may be a separate control logic or other combination of hardware, software and/or firmware, is coupled to processor 210 via a first communication channel 215. In an embodiment, communication channel 215 may be a serial interconnect. In turn, context filter 220 couples via a communication channel 225 to a controller 230. In various embodiments controller 230 may be a standalone sensor hub configured to interface with a plurality of a platform sensors such as user interface sensors, e.g., touch screen and/or touchpad interface, one or more cameras or other capture devices and so forth. Still further, in some embodiments controller 230 may further be a display controller and interface for a display of the system.

Depending on the activity of controller 230, context filter 220 may cause one or more performance increase requests received within processor 210 to be filtered or preempted from being allowed to be granted. Note that in an embodiment, context filter 220 may be woken up whenever there is a performance state change request. In general, context filter 220 may be configured to determine context (e.g., with reference to display and/or sensor hub activity) responsive to a request for an increased performance state. Based at least in part on the context filter configuration, it will allow/deny this request depending on how many past successful/failed requests have occurred. This determination may be based on a history of prior requests maintained by the context filter. As one example, assume context filter 220 is configured to filter or preempt 50% of the performance state change requests in a given time window (e.g., 80,000 microseconds (μs)). Thus 1 in 2 requests to upscale voltage/frequency will be ignored in the space of 80,000 μs. This would mean that, if the processor governor's sampling rate is 40,000 μs, increased performance state requests will only be successful once in every 80,000 μs. In an embodiment, a processor governor may be implemented as sample logic (e.g., as controlled by an OS) such that this internal sample rate of the kernel may be the period at which it is determined whether to update frequency/voltage. Of course understand that while shown with this particular high-level view in the embodiment of FIG. 2, the scope of the present invention is not limited and many variations and alternatives are possible. For example, in some embodiments context filter 220 may be implemented within processor 210. In yet further embodiments, a SoC may implement all of the components shown in FIG. 2.

Figure 3:
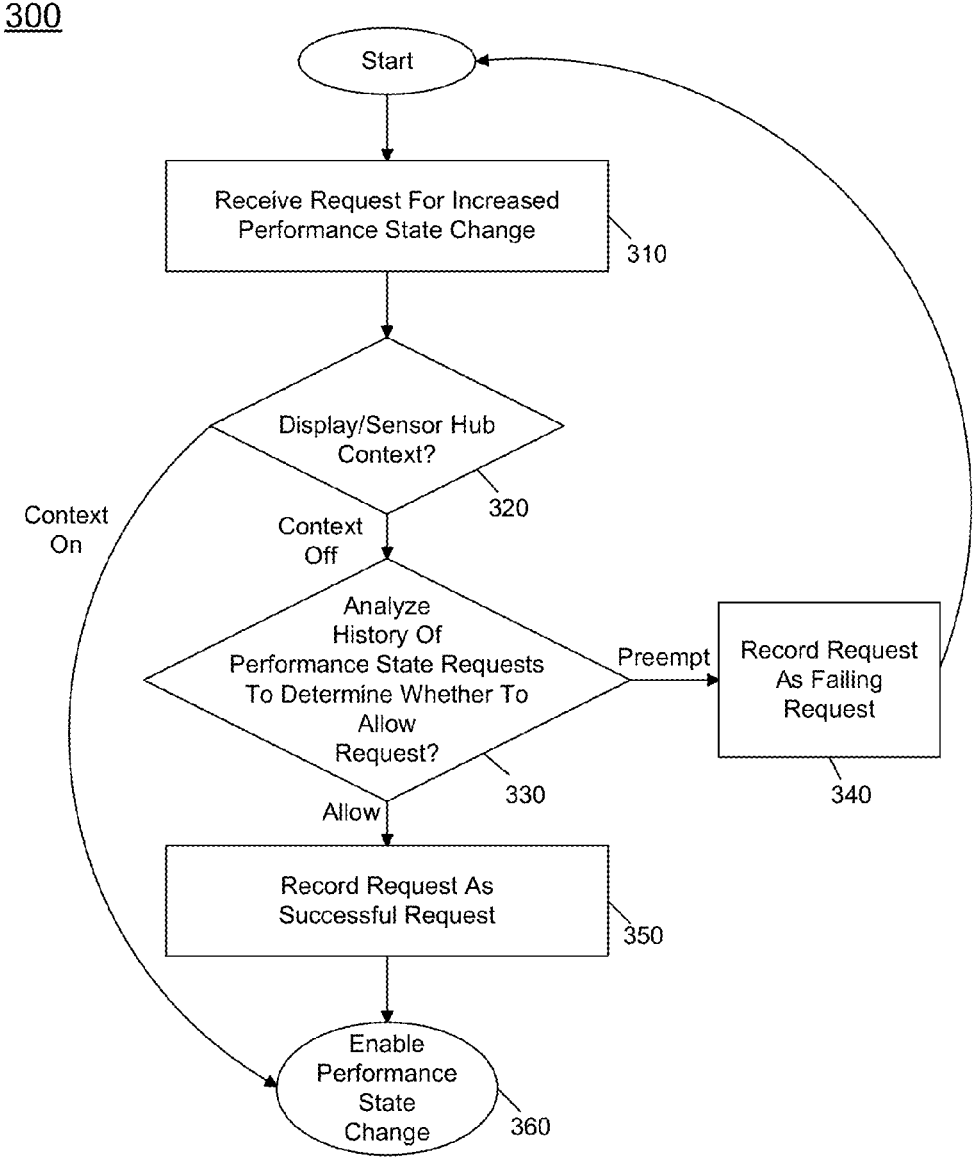
FIG. 3 is a flow diagram of a method in accordance with an embodiment of the present invention.

Referring now to FIG. 3, shown is a flow diagram of a method in accordance with an embodiment of the present invention. Method 300 may be performed at least in part by a context filter logic, which may be a standalone component or logic within a power control unit or other power controller of a processor or SoC. As seen, method 300 begins by receiving a request for an increased performance state change (block 310). More specifically, this performance state change request may be received from a kernel or other system software and may be a request for an increase in performance state, e.g., by increasing one or more of operating voltage and frequency of the processor. Note that in an embodiment this request may be received in a PCU of a processor. In turn, a context of a display/sensor hub may be determined (diamond 320). In an embodiment, this determination may be made by sending a status request to a context filter logic to determine whether a target context state element (e.g., display) is active or not. If the determination is that the display is active, in that the context is on or active, control passes directly to block 360 where the performance state change is enabled. More specifically, the power controller may increase a voltage and/or frequency as requested by the requester. As an example, a bin increase (e.g., of 100 MHz) to processor operating frequency may be performed (and potentially along with an operating voltage increase if needed or desired).

Still referring to FIG. 3, if the determination at diamond 320 is that the context is off (in that the display is inactive), control passes next to diamond 330 where a history of prior performance state increase requests may be analyzed. More specifically, a configurable number of immediately prior performance state requests may be analyzed to determine the number of succeeding and failing requests. If at least a configurable threshold of these previous performance state requests have been unsuccessful (e.g., failed), control passes to block 350 where the current request is allowed and may be recorded as a successful request. Thereafter control passes to block 360 where the performance state change is enabled to be effected. Otherwise if at diamond 330 it is determined that less than the configurable threshold of previous performance state requests have failed, the request is preempted and control passes to block 340 where the current request may be recorded as an unsuccessful request. Thus method 300 concludes for the current request with the request being preempted or filtered. Understand that while shown at this high level in the embodiment of FIG. 3, many variations and alternatives are possible.

In one particular example, this configurable threshold may be set at a 50% duty cycle such that half of incoming performance increase requests may be preempted, e.g., when a display driver and/or digitizer or other user interface is inactive. In this example with a 50% duty cycle, each request to scale to higher operating frequency/voltage may be filtered according to the last scaling request. Stated another way, the power controller will ignore half (in this example) of the upscaling requests. In embodiments, a power controller may also downscale frequency/voltage when possible. Here, the power controller may service each request to downscale the operating frequency/voltage while attempting to downscale operating frequencies/voltages at a lower rate than a sampling rate of a kernel governor.

In an embodiment, the PCU may be configured by the context filter to have its own mechanism to downscale processor frequency without external requests (e.g., from kernel or other software/hardware) solely based on the context. In an embodiment, this PCU downscale logic may either send a request to downscale the operating frequency/voltage pre-emptively without waiting for a next request in between sample rates, or may downscale operating frequency/voltage further when a downscale request is received (e.g., from P2 to P4 rather than P2 to P3). Using an embodiment of the present invention, battery lifetime of a portable device may be improved by greater than approximately 20%, e.g., in a system that executes commonly found social applications and is connected to a wireless connection (such as Wi-Fi or mobile data) with regular synchronization being performed in the background.

Figure 4:
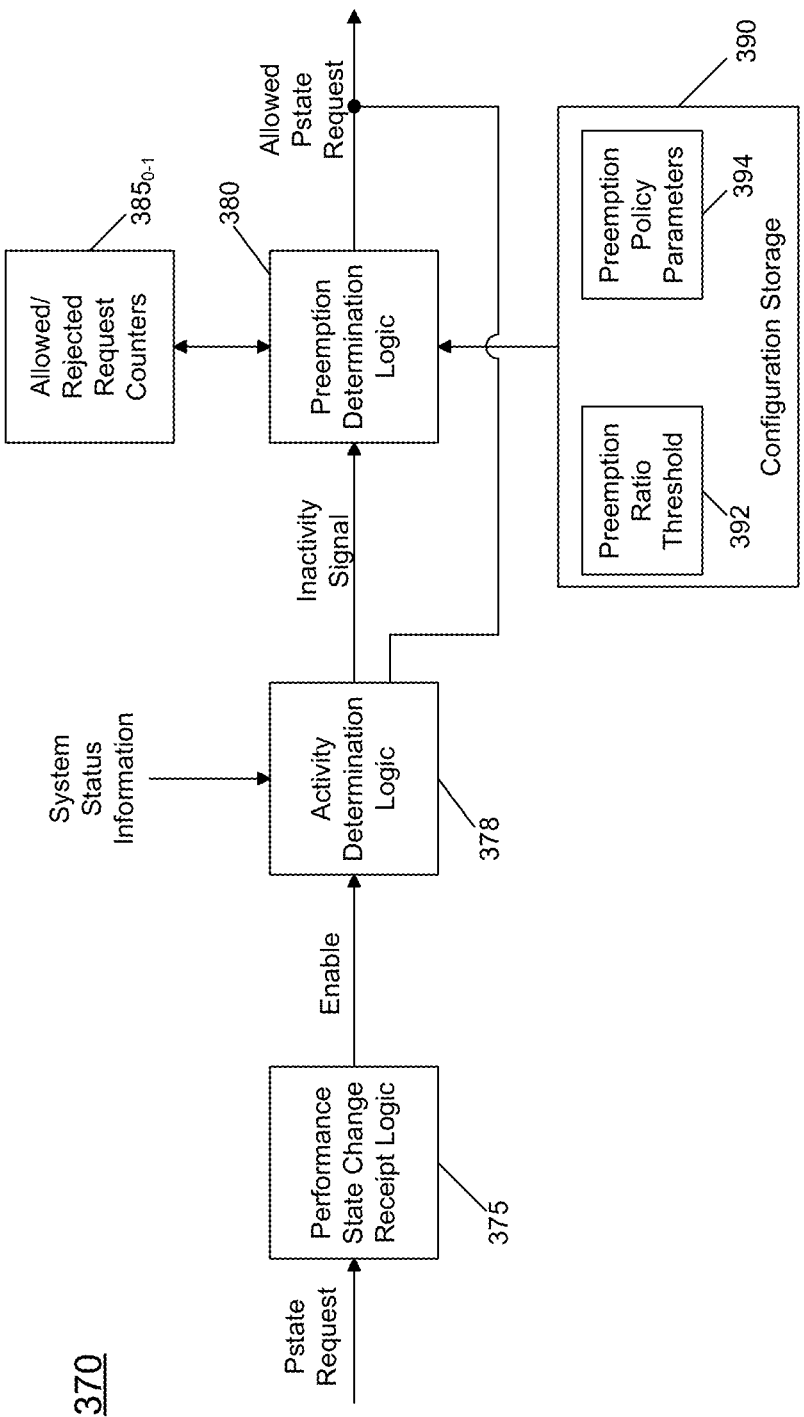
FIG. 4 is a block diagram of a context filter logic in accordance with an embodiment of the present invention.

Referring now to FIG. 4, shown is a block diagram of a context filter logic in accordance with an embodiment of the present invention. As shown in FIG. 4, logic 370 may receive various inputs and process information from these inputs to determine whether to filter an incoming performance state increase request. A performance state change receipt logic 375 is configured to receive incoming P-state change requests, e.g., as received from an OS, other power control logic or other locations of a system. Upon receipt of such request, an enable signal is generated to cause the remainder of the logic of context filter logic 370 to be activated.

In the embodiment shown, an activity determination logic 378 may receive various system status information, including activity status of one or more components of a platform. For example, in the discussion herein such status information may include an activity indication of a display such as touch screen. Based on incoming status information that indicates inactivity of a display or other relevant components, activity determination logic 378 may issue an inactivity signal to a preemption determination logic 380, which may receive various inputs. In the embodiment shown, these inputs include values of allowed and rejected request counters $385_0$-$385_1$. In an embodiment, these counters may store a number of allowed and rejected performance state change increase requests. In one such embodiment, the corresponding counter may be updated (e.g., by the preemption determination logic itself) when a performance state increase request is either allowed or denied while the relevant system components are in an inactive context state.

To further aid in determining whether to preempt a given performance state change request, preemption determination logic 380 may also receive information from a configuration storage 390. In an embodiment, configuration storage 390 may include a preemption ratio threshold storage 392, which may store a programmable threshold against which a comparison can be made. Still further, a preemption policy parameter storage 394 may store various policy information regarding preemption, such as a window size to be analyzed (with respect to the counters) and preemption policy information, such as an indication as to whether a deeper low power state than requested may occur (e.g., a P4 state instead of a P2 state) responsive to a request for a lower performance state, among other information.

Based on all of the inputs, preemption determination logic 380 may choose to allow the received performance state request to be issued as an allowed performance state change request, e.g., when a comparison result of allowed to rejected performance state change requests (as determined from the values in counters $385_0$-$385_1$) is less than a threshold obtained from preemption ratio threshold storage 392. Of course other options are possible, including rejecting the request. Note that in either case, the associated one of counters 385 may be updated accordingly.

Still further, as discussed above it is possible for preemption determination logic 380 to further issue allowed performance state change requests to be of a lesser performance level than that requested in case of a decrease request, when one or more system components are inactive.

Note that when the relevant system context is determined by activity determination logic 378 to be active, the incoming performance state change request may be directly output as an allowed performance state change request. In an embodiment, the allowed performance state change request output from preemption determination logic 380 (or directly from activity determination logic 378) may be sent to other portions of a power controller, such as an operating frequency/operating voltage update logic. Understand that while shown with this particular implementation in the embodiment of FIG. 4, many variations and alternatives are possible.

Figure 5:
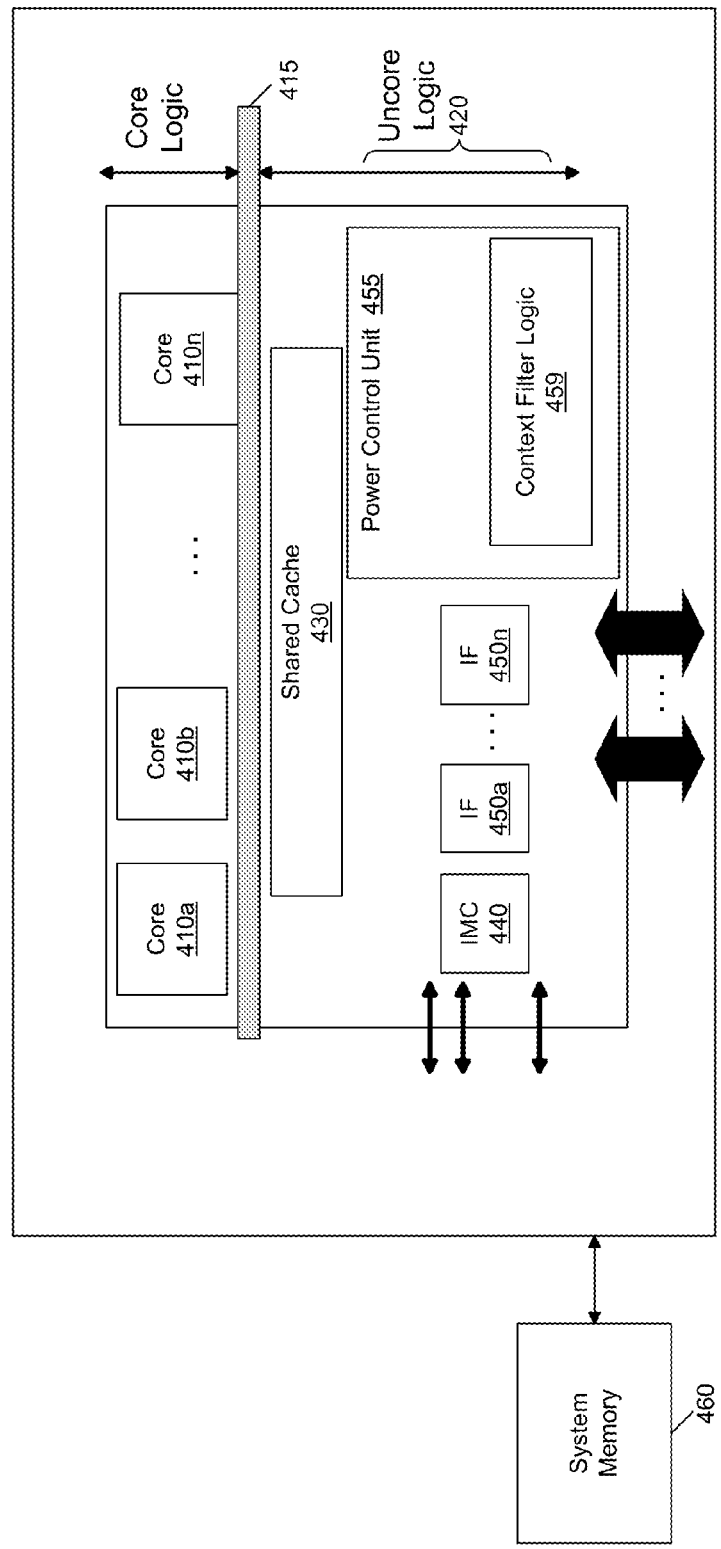
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a context filter logic 459 in accordance with an embodiment of the present invention. Using this logic, incoming performance state increase requests received from an OS, other portions of PCU 455 or other portions of a system, may be filtered depending on a context or activity level of one or more components of a system such as a display, as described herein.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
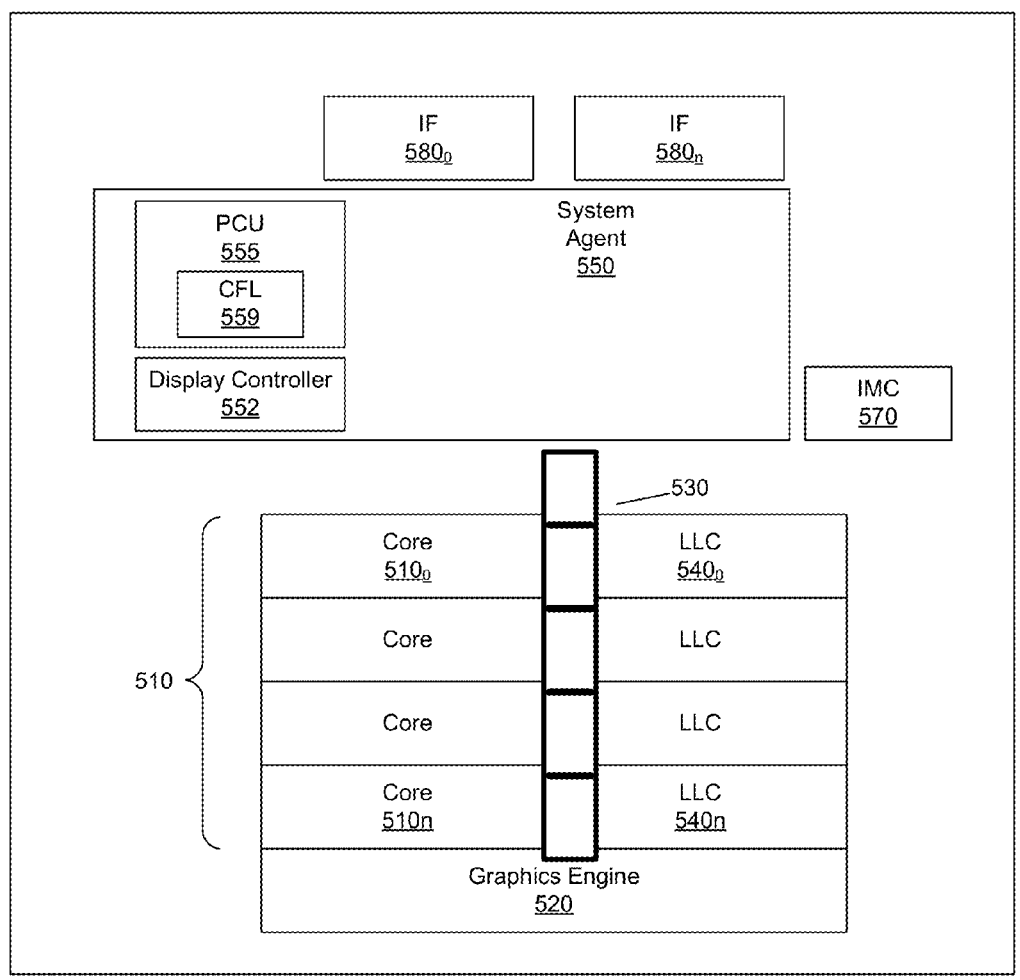
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a context filter logic 559 in accordance with an embodiment of the present invention to filter a predetermined number of incoming performance state change (increase) requests when a system is relatively lightly loaded, e.g., when a display or other system context indicates relatively limited user interaction with a system, such that greater system performance can be avoided or at least reduced. In various embodiments, this logic may execute the algorithm described above in FIG. 3 using the micro-architecture of FIG. 4.

As further seen in FIG. 6, processor 500 can further include an integrated memory controller (IMC) 570 that can provide for an interface to a system memory, such as a dynamic random access memory (DRAM). Multiple interfaces 580₀-580ₙ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
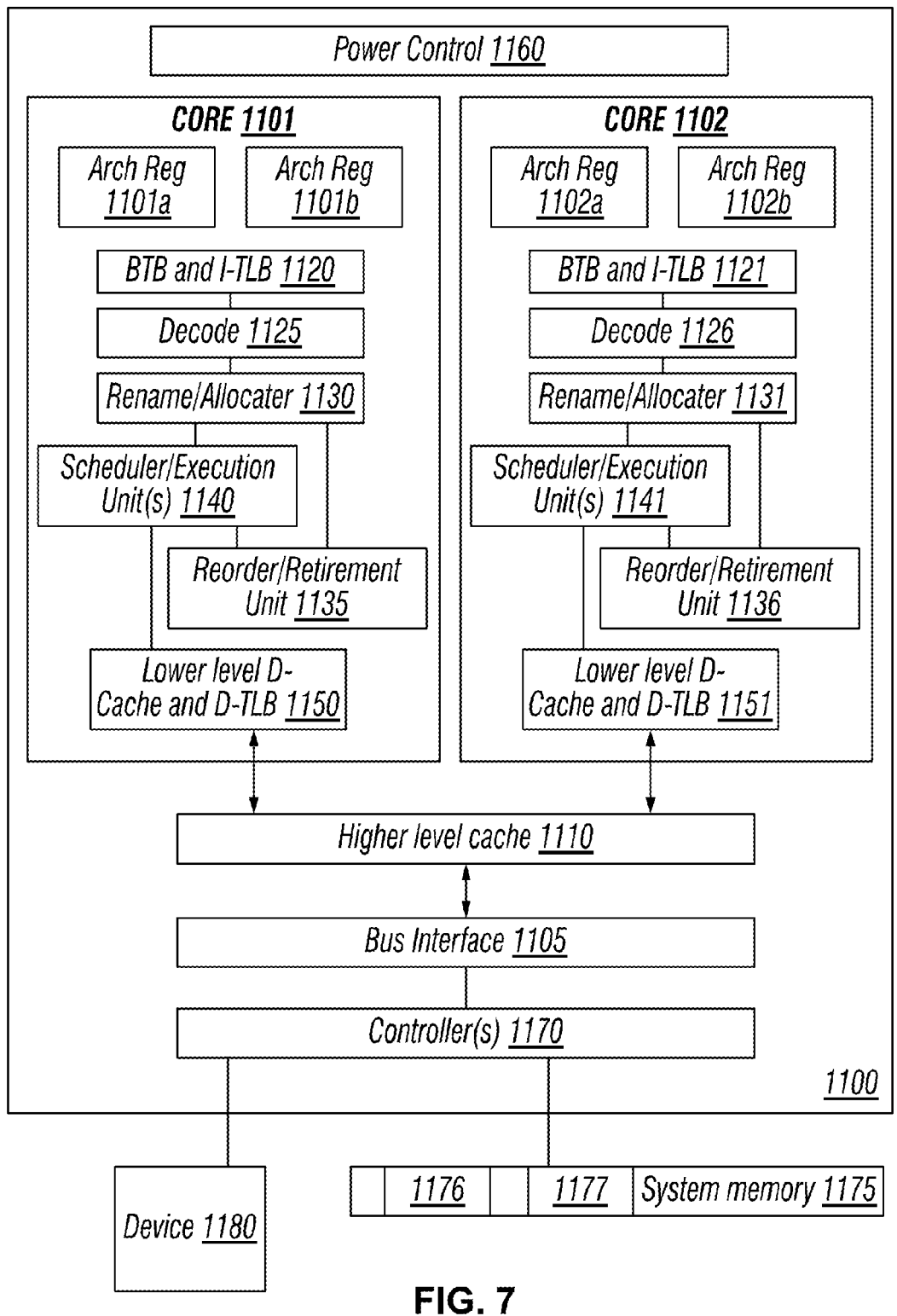
FIG. 7 is an embodiment of a processor including multiple cores.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
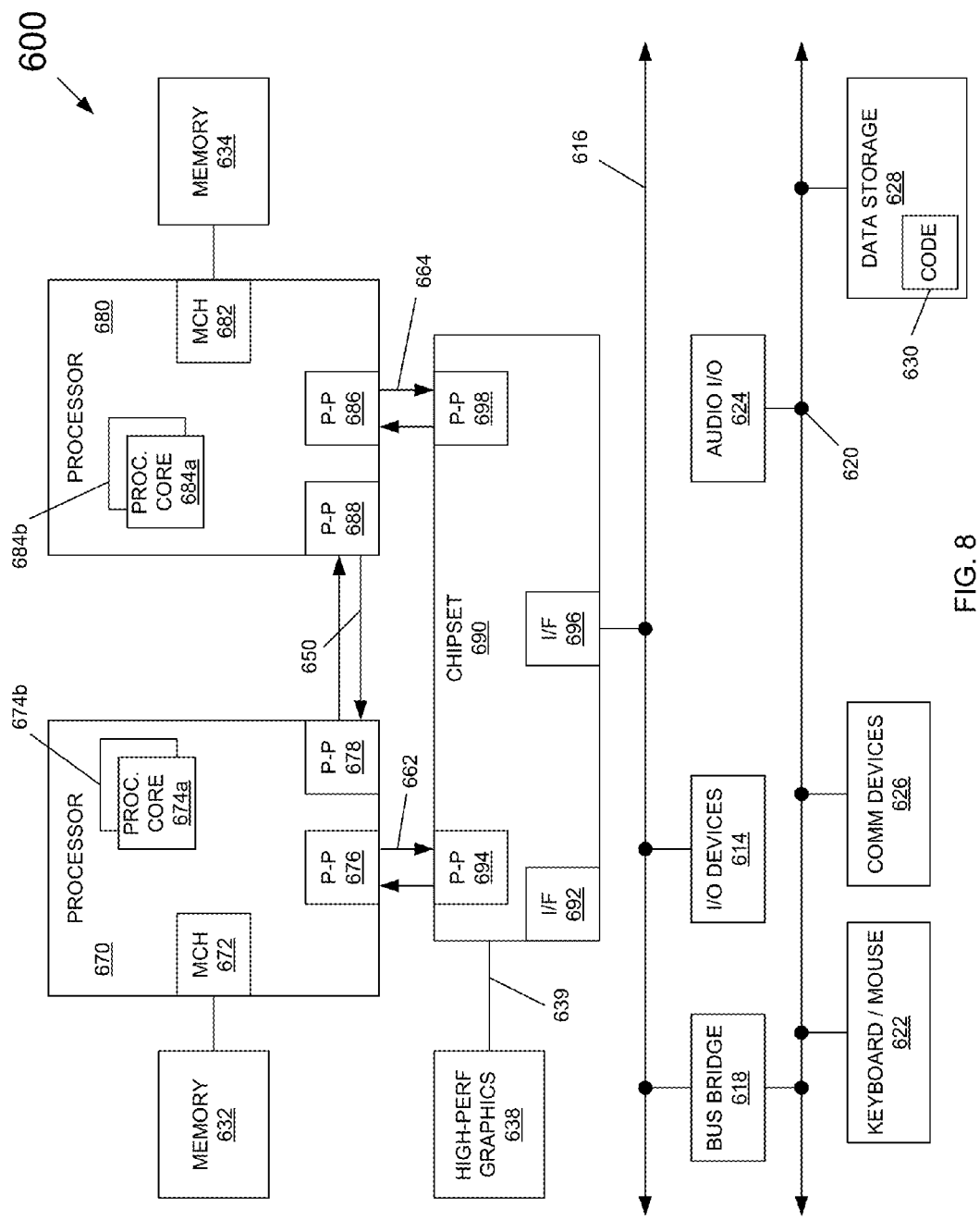
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to filter at least some incoming performance state increase requests based on system context, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 9:
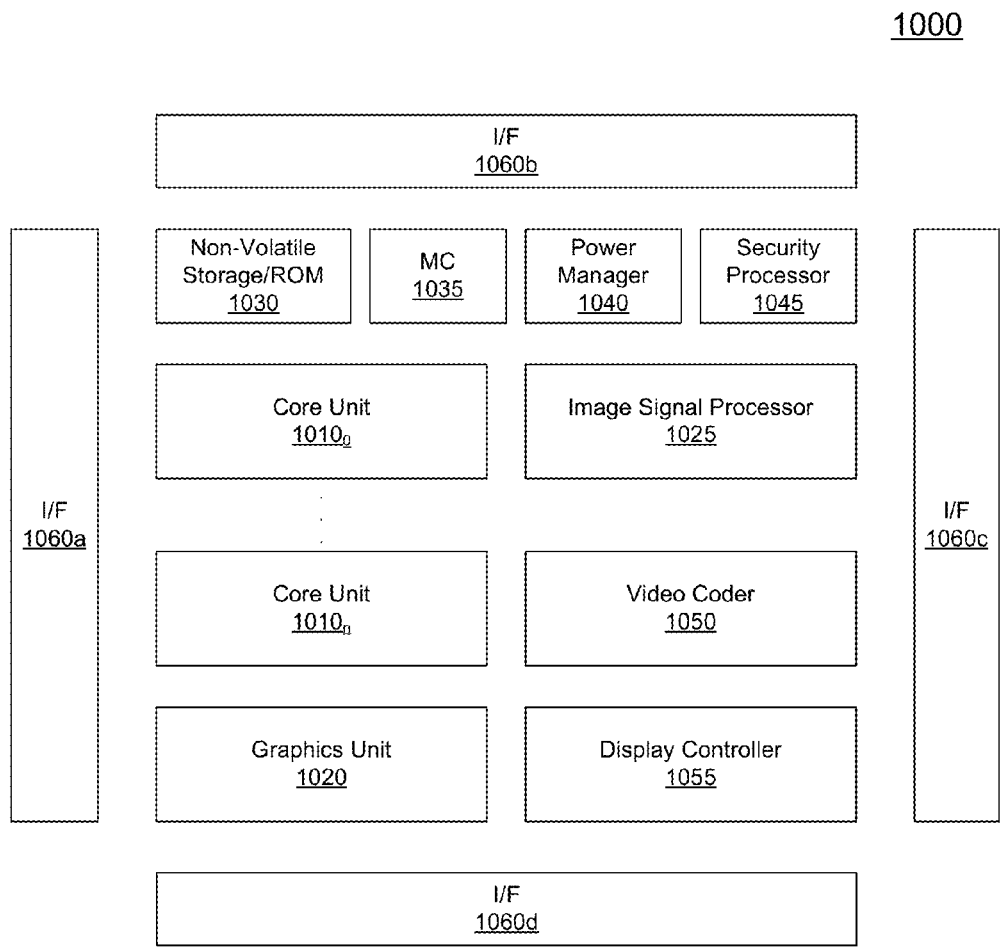
FIG. 9 is a block diagram of a processor in accordance with another embodiment of the present invention.

Referring now to FIG. 9, shown is a block diagram of a processor in accordance with another embodiment of the present invention. In the embodiment of FIG. 9, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 9, processor 1000 includes a plurality of core units 10100-1010n. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 9).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 9, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes control logic, such as a context filter logic, to preempt at least some received increased performance requests from being provided to operating voltage/operating frequency update logic of power manager 1040, to thus reduce the number of increased frequency/voltage changes, reducing power consumption.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™, GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

Figure 10:
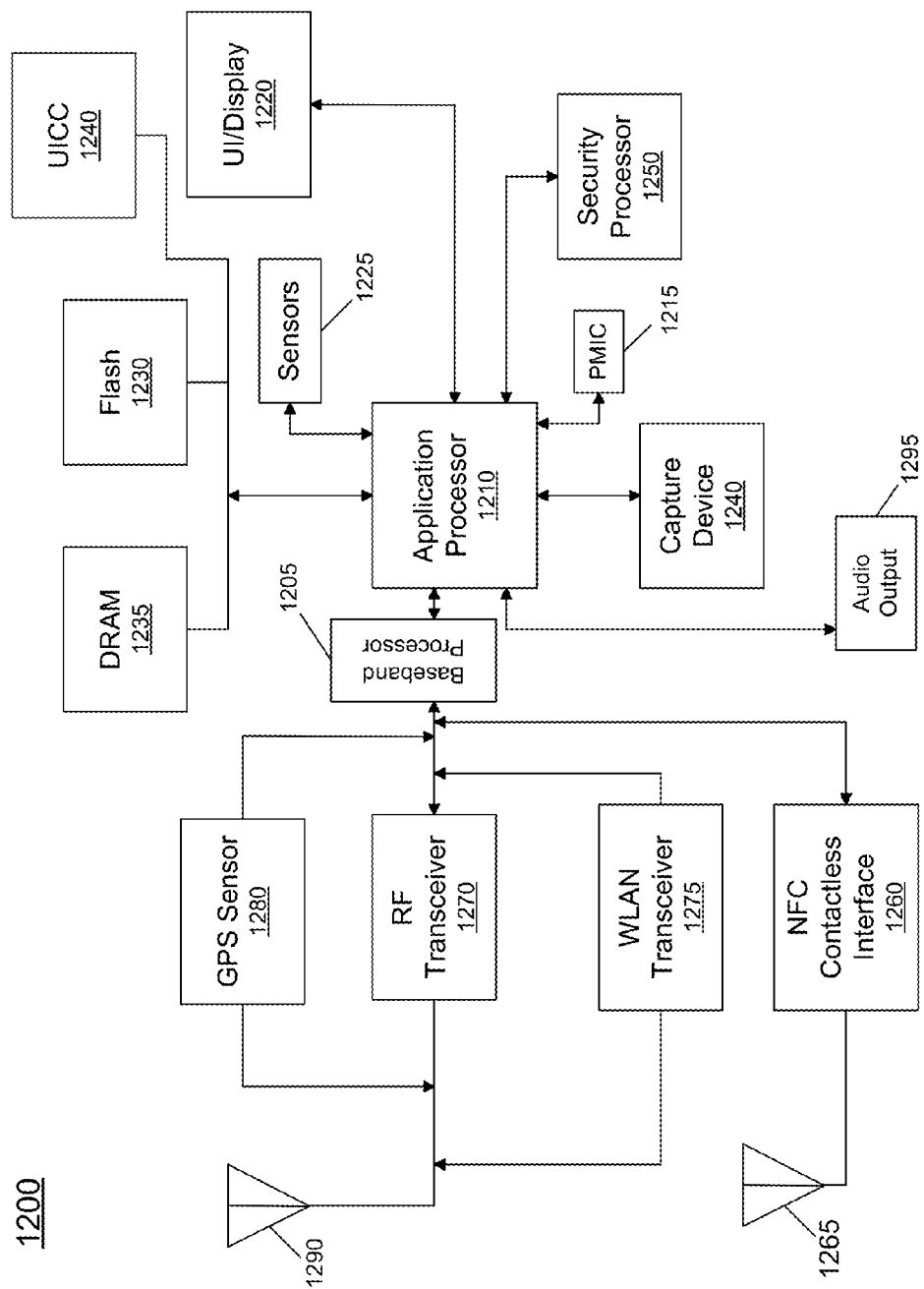
FIG. 10 is a block diagram of an example system with which embodiments may be used.

Referring now to FIG. 10, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device. In an embodiment, application processor 1210 may include a power controller having or coupled to a context filter logic to perform the performance increase request filtering described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 10, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 10, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 11:
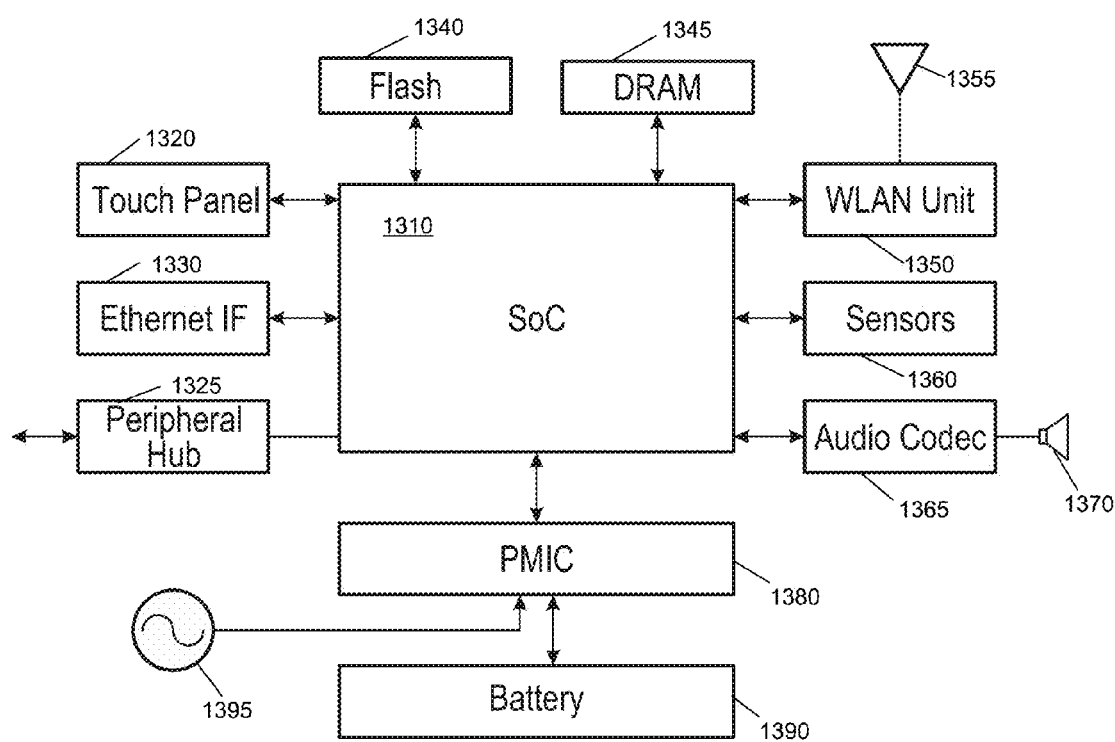
FIG. 11 is a block diagram of another example system with which embodiments may be used.

Referring now to FIG. 11, shown is a block diagram of another example system with which embodiments may be used. In the illustration of FIG. 11, system 1300 may be mobile low-power system such as a tablet computer, 2:1 tablet, phablet or other convertible or standalone tablet system. As illustrated, a SoC 1310 is present and may be configured to operate as an application processor for the device. In an embodiment, SoC 1310 may include a power controller having or coupled to a context filter logic to perform the performance increase request filtering described herein, such as based on display inactivity.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 11, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 11, many variations and alternatives are possible.

The following examples pertain to further embodiments.

In one example, a processor comprises: a core to execute instructions; a power controller to control an operating frequency of the core; and a context filter logic coupled to the power controller to prevent a performance state change request from being granted by the power controller based at least in part on a context of a system including the processor.

In an example, the context filter logic is to prevent the performance state change request from being granted further based on a count of successful performance state change requests within a time window. The context filter logic may prevent the performance state change request from being granted further based on a ratio of successful performance state change requests to failed performance state change requests within the time window.

In an example, a configuration storage is to store a ratio threshold, where the context filter logic is to prevent the performance state change request if the ratio exceeds the ratio threshold.

In an example, the context filter logic is to update the count of failed performance state change requests if the performance state change request is prevented from being granted. Note that the context filter logic may update the count of successful performance state change requests if the performance state change request is granted.

In an example, the context filter logic is to enable the performance state change request to be granted by the power controller when the system context is active. As an example, the system context comprises an activity level of a display of the system.

In an example, the power controller comprises the context filter logic. The context filter logic may be coupled between a sensor hub and the power controller, and is enabled responsive to the performance state change request, in an example.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another example, a method comprises: receiving a request to upscale performance of at least one core of a multicore processor of a system; determining an activity context of at least one user interface of the system; and enabling the performance upscale if the at least one user interface is active and if the at least one user interface is inactive, filtering the performance upscale request according to a history of performance upscale requests.

In an example, the method further comprises enabling the performance upscale according to the history of performance upscale requests if less than a threshold number of successful performance upscale requests have occurred within the history.

In an example, the method further comprises recording the performance upscale request as a failing performance upscale request if at least the threshold number of successful performance upscale requests have occurred within the history.

In an example, the method further comprises receiving the performance upscale request in a context filter, and providing the performance upscale request to a power controller of the multicore processor when the at least one user interface is inactive if less than the threshold number of successful performance upscale requests have occurred within the history.

In an example, the method further comprises reducing, via the context filter, a frequency of performance upscale requests provided to the power controller when the at least one user interface is inactive.

In an example, the method further comprises receiving a request to downscale performance of the at least one core, and enabling the performance downscale regardless of an activity level of the at least one user interface.

In an example, the method further comprises filtering the performance upscale request while the system is executing a media player application.

In another example, a computer readable medium including instructions is to perform the method of any of the above examples.

In another example, an apparatus comprises means for performing the method of any one of the above examples.

In another example, a system comprises: a processor including at least one core and a power controller to control an operating frequency and an operating voltage of the at least one core; a display coupled to the processor to display information; a hub controller to interface the display with the processor; and a control logic coupled to the hub controller to determine an activity state of the display and to prevent one or more operating frequency increase requests for the at least one core from being fulfilled during a time window when the display is inactive.

In an example, the power controller comprises the control logic.

In an example, the control logic is to prevent the one or more operating frequency increase requests from being provided to the power controller when the display is inactive.

In an example, the control logic is to filter a first portion of a plurality of operating frequency increase requests from being provided to the power controller when the display is inactive, and to allow a second portion of the plurality of operating frequency increase requests to be provided to the power controller when the display is inactive. In turn, the power controller is to cause the at least one core to operate with an increased operating frequency responsive to the second portion of the plurality of the operating frequency increase requests.

In an example, the system further comprises: a configuration storage to store a threshold; a first counter to store a count of prevented operating frequency increase grants; and a second counter to store a count of allowed operating frequency increase grants.

In an example, the control logic is to prevent the one or more operating frequency increase requests responsive to comparison of a result to the threshold, the result obtained using the count of prevented operating frequency increase grants and the count of allowed operating frequency increase grants.

In an example, the configuration storage is to further store context policy information, and responsive to the context policy information the power controller is to reduce the operating frequency of the at least one core to a second operating frequency, the second operating frequency less than a first operating frequency requested in an operating frequency decrease request.

In an example, the configuration storage is to further store context policy information, and responsive to the context policy information the power controller is to reduce the operating frequency of the at least one core without receipt of an operating frequency decrease request, based at least in part on the display inactivity.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a core to execute instructions;
    a power controller to control an operating frequency of the core; and a context filter logic coupled to the power controller to prevent a performance state change request from being granted by the power controller based at least in part on a context of a system, the context comprising an activity level of a display, the system including the processor.

2. The processor of claim 1, wherein the context filter logic is to prevent the performance state change request from being granted further based on a count of successful performance state change requests within a time window.

3. The processor of claim 2, wherein the context filter logic is to prevent the performance state change request from being granted further based on a ratio of successful performance state change requests to failed performance state change requests within the time window.

4. The processor of claim 3, further comprising a configuration storage to store a ratio threshold, wherein the context filter logic is to prevent the performance state change request if the ratio exceeds the ratio threshold.

5. The processor of claim 3, wherein the context filter logic is to update the count of failed performance state change requests if the performance state change request is prevented from being granted.

6. The processor of claim 5, wherein the context filter logic is to update the count of successful performance state change requests if the performance state change request is granted.

7. The processor of claim 1, wherein the context filter logic is to enable the performance state change request to be granted by the power controller when the system context is active.

8. The processor of claim 1, wherein the power controller comprises the context filter logic.

9. The processor of claim 1, wherein the context filter logic is coupled between a sensor hub and the power controller, and is enabled responsive to the performance state change request.

10. A non-transitory machine-readable medium having stored thereon instructions, which if performed by a machine cause the machine to perform a method comprising:
  receiving a request to upscale performance of at least one core of a multicore processor of a system;
  determining an activity context of at least one user interface of the system; and
  enabling the performance upscale if the at least one user interface is active and if the at least one user interface is inactive, filtering the performance upscale request according to a history of performance upscale requests.

11. The non-transitory machine-readable medium of claim 10, wherein the method further comprises enabling the performance upscale according to the history of performance upscale requests if less than a threshold number of successful performance upscale requests have occurred within the history.

12. The non-transitory machine-readable medium of claim 11, wherein the method further comprises recording the performance upscale request as a failing performance upscale request if at least the threshold number of successful performance upscale requests have occurred within the history.

13. The non-transitory machine-readable medium of claim 11, wherein the method further comprises receiving the performance upscale request in a context filter, and providing the performance upscale request to a power controller of the multicore processor when the at least one user interface is inactive if less than the threshold number of successful performance upscale requests have occurred within the history.

14. The non-transitory machine-readable medium of claim 13, wherein the method further comprises reducing, via the context filter, a frequency of performance upscale requests provided to the power controller when the at least one user interface is inactive.

15. The non-transitory machine-readable medium of claim 10, wherein the method further comprises receiving a request to downscale performance of the at least one core, and enabling the performance downscale regardless of an activity level of the at least one user interface.

16. The non-transitory machine-readable medium of claim 10, wherein the method further comprises filtering the performance upscale request while the system is executing a media player application.

17. A system comprising:
  a processor including at least one core and a power controller to control an operating frequency and an operating voltage of the at least one core;
  a display coupled to the processor to display information;
  a hub controller to interface the display with the processor; and
  a control logic coupled to the hub controller to determine an activity state of the display and to prevent one or more operating frequency increase requests for the at least one core from being fulfilled during a time window when the display is inactive.

18. The system of claim 17, wherein the power controller comprises the control logic.

19. The system of claim 17, wherein the control logic is to prevent the one or more operating frequency increase requests from being provided to the power controller when the display is inactive.

20. The system of claim 19, wherein the control logic is to filter a first portion of a plurality of operating frequency increase requests from being provided to the power controller when the display is inactive, and to allow a second portion of the plurality of operating frequency increase requests to be provided to the power controller when the display is inactive, wherein the power controller is to cause the at least one core to operate with an increased operating frequency responsive to the second portion of the plurality of the operating frequency increase requests.

21. The system of claim 17, further comprising:
  a configuration storage to store a threshold;
  a first counter to store a count of prevented operating frequency increase grants; and
  a second counter to store a count of allowed operating frequency increase grants.

22. The system of claim 21, wherein the control logic is to prevent the one or more operating frequency increase requests responsive to comparison of a result to the threshold, the result obtained using the count of prevented operating frequency increase grants and the count of allowed operating frequency increase grants.

23. The system of claim 21, wherein the configuration storage is to further store context policy information, and responsive to the context policy information the power controller is to reduce the operating frequency of the at least one core to a second operating frequency, the second operating frequency less than a first operating frequency requested in an operating frequency decrease request.

24. The system of claim 21, wherein the configuration storage is to further store context policy information, and responsive to the context policy information the power controller is to reduce the operating frequency of the at least one core without receipt of an operating frequency decrease request, based at least in part on the display inactivity.

* * * * *